April 4, 1939.  G. H. FISHER  2,152,843
CONTROL APPARATUS
Filed June 22, 1935  2 Sheets-Sheet 1

George H Fisher

April 4, 1939. G. H. FISHER 2,152,843
CONTROL APPARATUS
Filed June 22, 1935 2 Sheets-Sheet 2
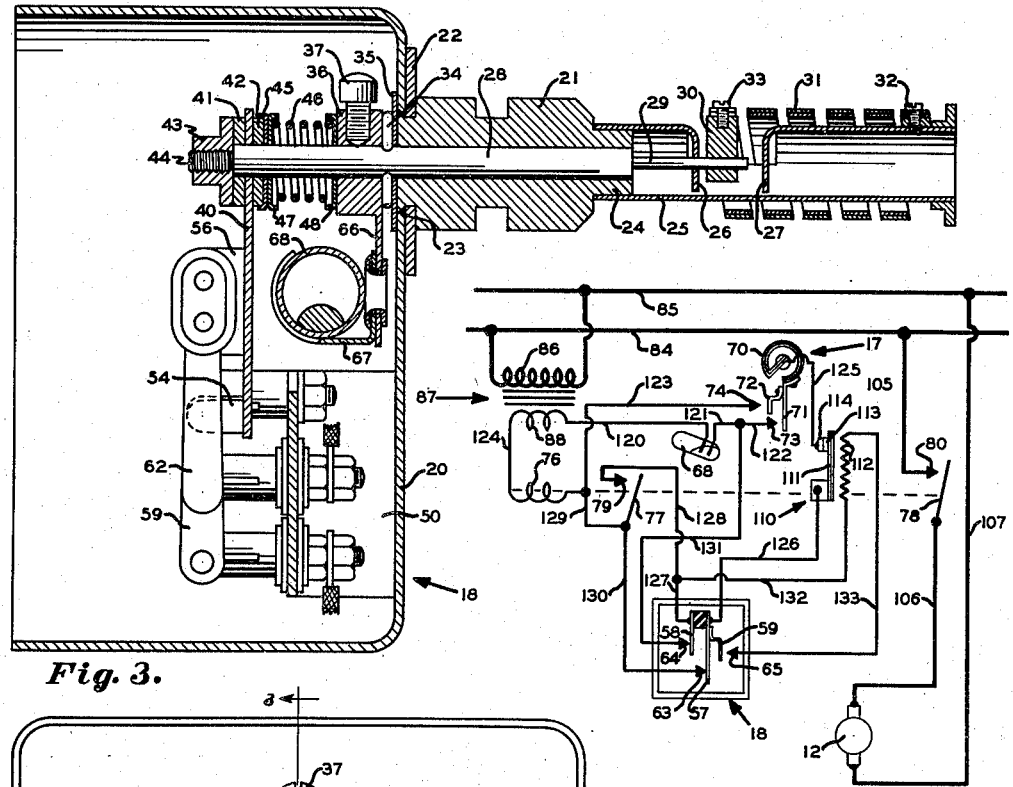
Fig. 3.
Fig. 4.
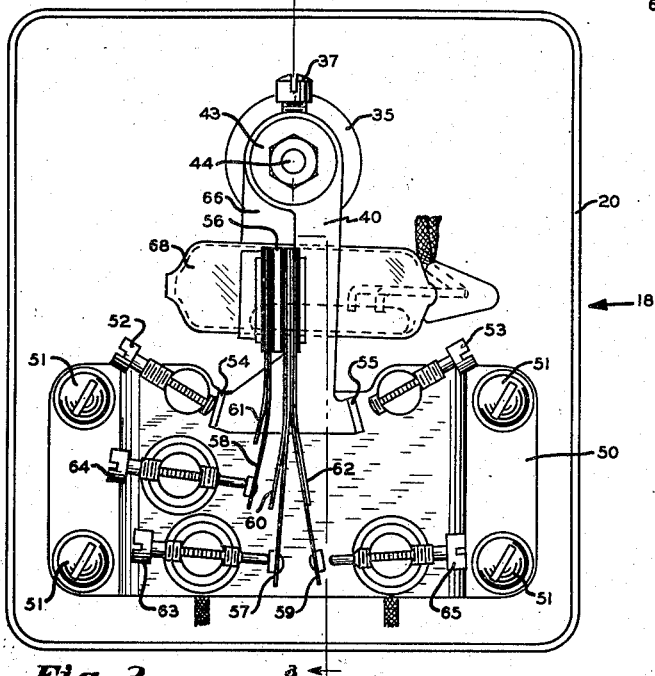
Fig. 2.
George H Fisher Patented Apr. 4, 1939

2,152,843

UNITED STATES PATENT OFFICE 2,152,843

CONTROL APPARATUS

George H. Fisher, Minneapolis, Minn., assignor to Minneapolis-Honeywell Regulator Company, Minneapolis, Minn., a corporation of Delaware Application June 22, 1935, Serial No. 27,926

8 Claims. (Cl. 236—9)

The present invention relates to an improved method and system by which a condition or force may be maintained more nearly at the desired value than has been possible by prior systems and methods. This invention is an improvement over that disclosed and claimed in application Serial No. 532, filed by William M. Schweickart on January 5, 1935, now United States Patent No. 2,093,649, granted September 21, 1937.

One of the objects of the present invention is the provision of a system for controlling the value of a condition or force in which a condition or force changing device is controlled by the cooperative action of two devices, one of which responds to one condition or force and the other of which responds to changes in another condition or force produced directly by the condition or force changing means, or responds to changes in the effectiveness of the condition or force changing means, such changes having no definite relation to the actual value of the condition, force or effectiveness.

In the particular embodiment of the invention to be hereinafter described, the condition or force changing device takes the form of a temperature changer and particularly a heater, such as a boiler fired by any suitable means, for instance the well-known gas burner. The condition to which one of the control devices responds is a temperature condition and many well be the temperature of the space to be controlled. The other control device, in the case of a heating system, responds to changes in some condition directly produced by the heater such as changes in heater temperature or pressure, and in the specific embodiment of this invention this device responds to boiler water temperature. In order to render this second control device responsive to changes as distinguished from actual values, it preferably comprises a control element such as a switch or a plurality of switches, that is associated with a device responsive to actual values through the medium of the well-known non-positive transmission means or slip-frictional connection.

A further object of the invention is the provision of a new method for controlling the value of a condition or force which method includes the steps of placing a condition or force changing device into operation when a first condition or force reaches a given value, then maintaining operation of said condition or force changing device independently of said first condition or force until there is a predetermined change in a second condition or force or in the effectiveness of the condition or force changing device, and thereafter controlling the condition or force changing device in accordance with the value of said first condition or force, and varying the effect of the first condition or force on the condition or force changing device.

A further object of the invention is the provision of a new method for controlling the value of a condition or force which method includes the steps of placing a condition or force changing device into operation when a first condition or force reaches a given value, then maintaining operation of said condition or force changing device independently of said first condition or force until there is a predetermined change in a second condition or force or in the effectiveness of the condition or force changing device, and thereafter controlling the condition or force changing device in accordance with the value of said first condition or force, and controlling the condition or force changing device solely by the first condition or force when said first condition or force assumes a given value.

A further object of the invention is the provision of a new method for controlling the value of a condition or force which method includes the steps of placing a condition or force changing device into operation when a first condition or force reaches a given value, then maintaining operation of said condition or force changing device independently of said first condition or force until there is a predetermined change in a second condition or force or in the effectiveness of the condition or force changing device, and thereafter controlling the condition or force changing device in accordance with the value of said first condition or force, and preventing control of the condition or force changing device when the second condition or force assumes a given value.

Another object of the invention is the provision of a condition or force changing system in which a condition or force changing device is placed in operation by a first control device responsive to actual values of a first condition or force and is then maintained in operation by means of a second control device responsive to changes in another condition or force, or responsive to changes in the effectiveness of the condition or force changing device. In the disclosed embodiment of the invention, the control of the condition or force changing device is returned to the first control device after the other condition or force or the effectiveness of the condition or force changing device has changed in one direction a predetermined amount. Also, preferably, the arrangement is such that the first control device is incapable of placing the condition or force changing device in operation until the other condition or force, or the effectiveness of the condition or force changing device has changed at least a predetermined amount in the opposite direction. Further, the arrangement is such that after the first control device is permitted to place the condition or force changing device in operation, the control device is adjusted or interrupted in its control of the force changing device by a timing mechanism.

Further objects and advantages of invention will become apparent to those skilled in the art upon reference to the accompanying specification, claims and drawings in which:

Fig. 2 is a front view of one of the control devices used in the present invention.

Fig. 3 is a sectional view taken substantially on the line 3—3 of Fig. 2, and

Fig. 4 is a diagrammatic showing of another form of the system constructed in accordance with the present invention.

Figure 1:
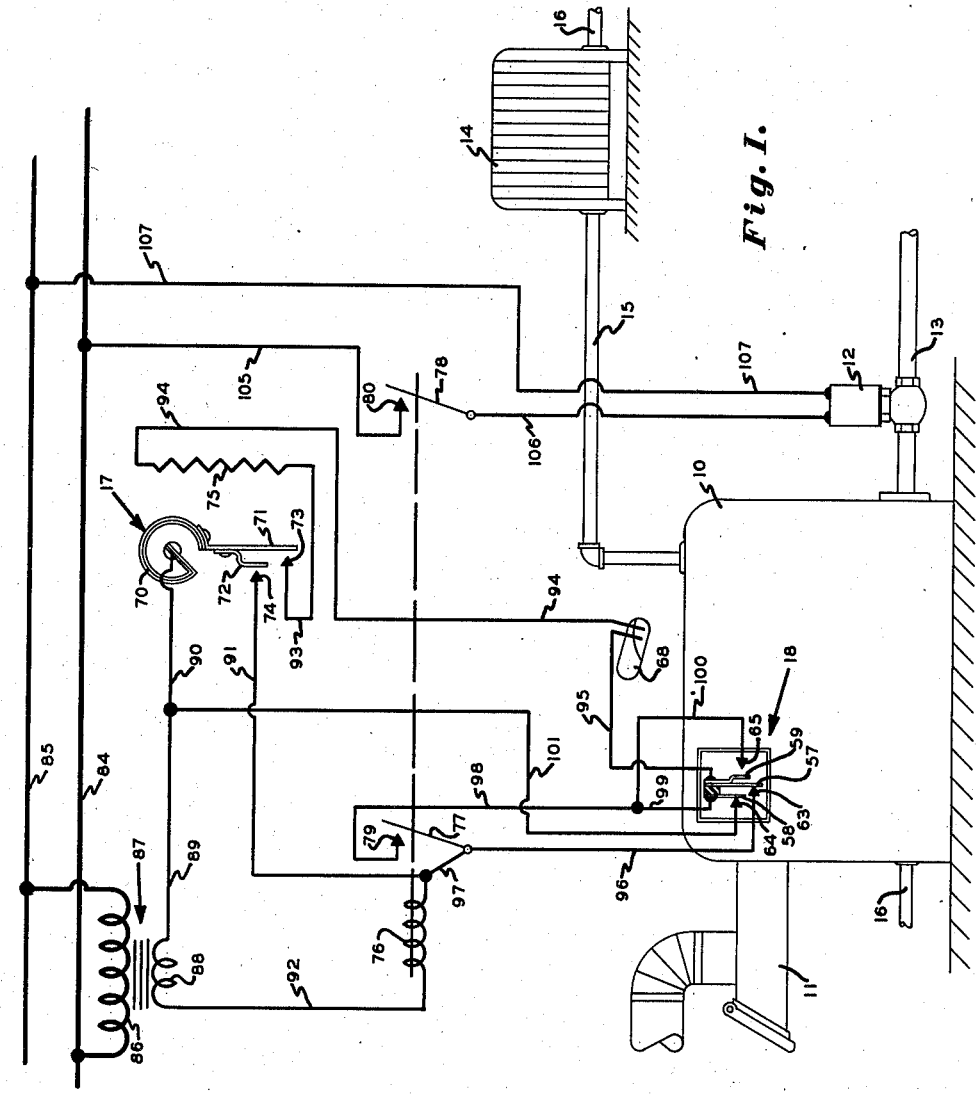
Fig. 1 is a diagrammatic showing of one form of my system constructed in accordance with the present invention.

Referring first to Fig. 1 of the drawings, a condition or force changing device is herein shown as comprising a boiler 10 which is provided with the usual stack pipe 11. Although any firing means may be used, the boiler 10 is shown as being fired by gas which is supplied to the boiler from some source not shown by means of a pipe 13. The supply of gas to the boiler 10 through the pipe 13 is controlled by a solenoid valve 12 of usual design. The boiler 10 operates to supply a fluid heating medium to a radiator 14 located in the space to be heated by means of a supply pipe 15. The fluid medium after passing through the radiator 14 returns to the boiler 10 by means of a return pipe 16. It will be understood that this showing of the boiler 10 and radiator 14 is merely exemplary of one type of condition or force changing device or temperature changing means and that others could be substituted therefor without departing from the spirit of this invention. It will be further understood that this heating system should be supplied with the usual fixtures, such as traps, etc., as is well-known in the art.

The solenoid valve 12 is primarily controlled by a condition or force responsive device indicated generally at 17, herein shown in the form of a thermostatic switch that preferably responds to the temperature of the space being heated. The solenoid valve 12 is additionally controlled by a control device generally indicated at 18, which responds to changes in another condition or force, or responds to changes in the effectiveness of the boiler 10 and is herein shown as comprising a slip friction switching mechanism responsive to changes in the temperature of the boiler water.

Turning now to Figs. 2 and 3, the slip friction switching mechanism, generally indicated at 18, comprises a casing 20 of substantially square configuration. To the rear of casing 20 is secured a cylindrical mounting member 21, there being a washer or spacer 22 interposed between the cylindrical mounting member 21 and the rear wall of the casing 20. The cylindrical mounting member 21 may be secured to the rear wall of casing 20 in any suitable manner such as by peening over a reduced portion which extends through the casing 20 as indicated at 23. The outer end of mounting member 21 is provided with a reduced portion 24 over which is placed a tubular member 25, the tubular member 25 being secured to the mounting member 21 by any suitable means such as by brazing. The tubular member 25 has a portion of its surface stamped inwardly to provide a pair of flanges 26 and 27. A torsion rod 28, having one of its ends terminating within casing 20, extends through mounting member 21 and is provided with a reduced portion 29 which extends through flange 26 and terminates between flanges 26 and 27. A metallic block 30 is suitably secured to the end of reduced portion 29. One end of a bimetallic helically coiled element 31 is secured to tubular member 25 by means of a screw 32, whereas its other end is secured to metallic block 30 by means of a screw 33. Excessive axial movement of torsion rod 28 towards the left (as viewed in Fig. 3) is prevented by engagement of block 30 with the flange 26 while excessive axial movement in the other direction is prevented by a cotter pin 34 which extends through torsion rod 28 at a point just within the casing 20. Preferably, a washer 35 is placed between cotter pin 34 and the inside surface of the back wall of casing 20.

Just within the casing 20, a stop member 36 is secured to torsion rod 28 by means of a set screw 37. The torsion rod 28 further carries a switch operating arm 40 that is loosely mounted thereon. On each side of this switch operating arm 40 is placed friction washers 41 and 42. Movement of friction washer 41 to the left is prevented by a nut 43 which is threaded upon a reduced terminal portion 44 of torsion rod 28. The friction washer 42 is received by a cup 45. The switch actuating arm 40 is resiliently clamped between the friction washers 41 and 42 by a coiled compression spring 46 which is held by a pair of spring retainers 47 and 48, one of which abuts the cup 45 and the other of which abuts the stop member 36. It will therefore be seen that the switch actuating arm 40 is frictionally connected to the torsion rod 28 whereby it may normally move in conformity with the movements of the torsion rod 28 but further movement of torsion rod 28 is allowed when switch actuating arm 40 reaches the limit of its motion in either direction.

In the lower portion of casing 20, a bracket 50 is secured by means of screws 51. This bracket 50 supports a pair of adjustable stop screws 52 and 53 which respectively cooperate with stop members 54 and 55 that are formed by bending over portions of the switch actuating arm 40. By adjusting these stop screws 52 and 53, the switch actuating arm 40 can be limited to varied ranges of movement. The switch actuating arm 40 is further provided with a bent over portion 56 to which is secured three switch arms 57, 58 and 59. It will be noted that the switch arms 57, 58 and 59 are provided with suitable backing members 60, 61 and 62. The arrangement is such that these various switch arms and backing members are electrically insulated one from the other. The switch arm 57 cooperates with a contact screw 63, the switch arm 58 cooperates with a contact screw 64, and the switch arm 59 cooperates with a contact screw 65. The contact screws 63, 64 and 65 are all supported by brackets 50 and are insulated therefrom in any suitable manner. The arrangement is such that switch arms 57 and 58 engage their contact screws 63 and 64 upon movement of the switch actuating arm 40 in clockwise direction as viewed in Fig. 2, whereas contact arm 59 engages its contact screw 65 upon counter-clockwise rotation of switch actuating arm 40 as viewed in the same figure.

As shown in Fig. 1, the bimetallic element 31 is subjected to the temperature of the boiler water in the boiler 10. The parts are shown in Fig. 2 in the position they assume after there has been a predetermined drop in boiler water temperature. Upon an increase in boiler water temperature, switch arm 57 is first moved from engagement with its contact screw 63 by its backing member 60. The switch arm 59 then engages its contact screw 65 and thereafter switch arm 58 is disengaged from its contact screw 64 by its backing member 61. Upon continued rise in boiler water temperature the stop member 55 engages stop screw 53 whereby further movement of switch actuating arm 40 is prevented but further movement of torsion rod 28 is allowed by reason of the slip friction connection heretofore described. Switch arm 59 will flex away from its backing member 62 to permit this additional movement of switch actuating arm 40.

Upon a decrease in boiler water temperature, stop member 55 will leave stop screw 53 and, as the boiler water temperature continues to fall, the switch arm 58 will engage its contact screw 64, after which it will be flexed slightly so that it moves away from its backing member 61 a small amount. During this time, the backing member 62 has been moving towards switch arm 59 and upon a continued boiler water temperature fall, the backing member 62 will move switch arm 59 from engagement with contact screw 65. Upon continued temperature fall contact arm 57 will flex away from its backing member 60. It will be noted that the provision of backing members 60, 61 and 62, while allowing flexing of switch arms 57, 58 and 59 upon engagement with their respectively contact screws 63, 64 and 65, provide for moving these switch arms 57, 58 and 59 from engagement with the respective contacts in a definite order determined by the adjustment of contact screws 63, 64 and 65. Upon slight further boiler water temperature fall, the stop member 54 engages stop screw 52 whereupon further rotation of switch operating arm 40 is prevented but the heretofore described slip connection allows continued rotation of torsion rod 28.

The stop member 36, which is rigidly secured to the torsion rod 28, is provided with a depending arm 66 to which is secured in any suitable manner a mercury switch clip 67. Mounted in the clip 67 and tilted thereby is a mercury switch 68, having the usual electrodes and mercury contained therein. Since the stop member 36 is rigidly secured to the torsion rod 28, the depending arm 66 and consequently the mercury tube 68 are positioned in direct response to the temperature value of the boiler water. The mercury switch clip 67 is so positioned with respect to the depending arm 66 that the mercury tube 68 will be tilted to an open or circuit breaking position when the boiler water temperature rises to a predetermined high value. In other words, the mercury switch 68 performs a high limit control function.

The control device 17 located in the space to be heated, comprises a bimetallic element 70, carrying switch arms 71 and 72. The switch arm 71 is adapted to engage a contact 73, and the switch arm 72 is adapted to engage a contact 74. Upon an increase in room temperature affecting the bimetallic element 70, the switch arms 71 and 72 are moved to the right, as viewed in Fig. 1, and upon a decrease in the room temperature the switch arms 71 and 72 are moved to the left. The contacts 73 and 74 are so adjusted that the distance between the switch arm 71 and the contact 73 is less than the distance between the switch arm 72 and the contact 74. By reason of this relationship, upon a decrease in room temperature to say 72°, the switch arm 71 engages the contact 73 and upon a further decrease in room temperature to, say 70°, the switch arm 72 engages the contact 74. Located in close proximity to the bimetallic element 70, is an electric heater 75 which is adapted at certain times to heat the bimetallic element 70 to move the switch arm 71 out of engagement with its contact 73.

A relay coil 76 is adapted to control switch arms 77 and 78 so that upon energization of the relay coil 76 the switch arms 77 and 78 are moved into engagement with contacts 79 and 80 respectively. Upon deenergization of the relay coil 76 the switch arms 77 and 78 are moved out of engagement with the contacts 79 and 80 by means of gravity or springs or other means, not shown.

Line wires leading from some source of power, not shown, are designated at 84 and 85. A primary 86 of a step-down transformer 87 having a secondary 88, is connected across the line wires 84 and 85. One end of secondary 88 is connected by means of wires 89 and 90 to the bimetallic element 70 of the controller 17. The contact 74 which cooperates with the switch arm 72, is connected by a wire 91 to one end of the relay coil 76. The other end of the relay coil 76 is connected by a wire 92 to the other end of secondary 88. The contact 73 which cooperates with the switch arm 71, is connected by a wire 93 to one end of the electric heater 75. The other end of the electric heater 75 is connected by a wire 94 to one of the electrodes of the mercury switch 68, the other electrode of the mercury switch 68 being connected by a wire 95 to the switch arms 57 and 59 of the controller 18. The contact 63, which cooperates with the switch arm 57, is connected by a wire 96 to the switch arm 77, which in turn is connected by a wire 97 to the junction of wire 91 and the relay coil 76. The contact 79, which cooperates with the switch arm 77, is connected by wires 98 and 99 to the switch arm 58 of the controller 18. The contact 65 of the controller 18 is connected by a wire 100 to the junction of wires 98 and 99. The contact 64 of the controller 18 is connected by a wire 101 to the junction of wires 89 and 90. The line wire 84 is connected by a wire 105 to the contact 80, which is associated with the switch arm 78, and the latter is connected by a wire 106 to the solenoid valve 12. The solenoid valve 12 is also connected by a wire 107 to the line wire 85 so that when the switch arm 78 is moved into engagement with the contact 80, the solenoid valve 12 is energized and opened to supply fuel to fire the boiler 10. When contact between the switch arm 78 and contact 80 is broken, the solenoid valve 12 is deenergized and closed to prevent the further firing of the boiler 10.

With the parts in the position shown in Fig. 1, the room or space temperature is at or above the desired value since the switch arms 71 and 72 are disengaged from their contacts 73 and 74. The boiler water temperature, however, has dropped the predetermined amount since switch arms 57 and 58 are engaged with their respective contact screws 63 and 64 and switch arm 59 is disengaged from its contact screw 65. The boiler water temperature will continue to fall but the parts of the switching mechanism 18 will stay in the positions shown. After a time, since the boiler 10 is not being fired, the room or space temperature will fall to a value, say 72°, so as to bring the switch arm 71 into engagement with the contact 73. When contact is established between these two elements a circuit is completed from the secondary 88 through wires 89 and 90, bimetallic element 70, switch arm 71, contact 73, wire 93, electric heater 75, wire 94, mercury switch 68, wire 95, switch arm 57, contact screw 63, wires 96 and 97, relay coil 76 and wire 92 back to the secondary 88. Completion of this circuit causes energization of the relay coil 76 to move the switch arms 77 and 78 into engagement with their respective contacts 79 and 80. Movement of switch arm 78 into engagement with the contact 80 causes firing of boiler 10, with a consequent supply of heat to the space to be heated. Movement of the switch arm 77 into engagement with the contact 79 completes a holding or maintaining circuit from the secondary 88 through wires 89 and 101, contact screw 64, switch arm 58, wires 99 and 98, contact 79, switch arm 77, wire 97, relay coil 76 and wire 92 back to secondary 88. Completion of this circuit maintains the relay coil 76 energized even though the switch arm 71 of the controller 17 should move out of engagement with its contact 73. This maintaining circuit for maintaining the relay coil 76 energized shunts the energizing circuit through the heater 75 so that the heater 75 is not energized to heat the bimetallic element 70 to move the switch arm 71 out of engagement with its contact 73.

Since the relay coil is now energized to cause firing of the boiler 10, the boiler water temperature begins to rise to break contact between the switch arm 57 and the contact screw 63. The relay coil 76, however, will remain energized by reason of the above outlined maintaining circuit. Upon a further rise in boiler water temperature, due to continued firing of the boiler 10, switch arm 59 moves into engagement with contact screw 65, the switch arm 58 and the contact 64 still being in engagement. If the room thermostat 17 is still calling for heat so that the flexible switch arm 71 is in engagement with the contact 73, movement of the switch arm 59 into engagement with the contact 65 completes a circuit from the secondary 88 through wires 89 and 90, bimetallic element 70, switch arm 71, contact 73, wire 93, heater 75, wire 94, mercury switch 68, wire 95, switch arm 59, contact screw 65, wire 100, wire 98, contact 79, switch arm 77, wire 97, relay coil 76, and wire 92 back to the secondary 88. Completion of this circuit, however, does not cause heating of the heater 75 since the relay coil 76 is still maintained energized by the above referred to maintaining circuit which shunts out the heater 75. Therefore the boiler is still maintained fired by the above referred to maintaining circuit.

Upon a further rise in boiler water temperature the switch arm 58 is moved out of engagement with the contact 64, which breaks the above referred to maintaining or shunting circuit, but the relay coil 76 remains energized by the circuit through the heater 75 and through the switch arm 59 and the contact screw 65. By reason of the breaking of this maintaining or shunting circuit upon this further rise in boiler water temperature, the heater 75 is energized and, after a given time, determined by the resistance of the heater and by the temperature of the space to be heated, the switch arm 71 is moved out of engagement with the contact 73. This causes de-energization of the relay coil 76 with the consequent movement of switch arms 77 and 78 out of engagement with their respective contacts 79 and 80. Movement of switch arm 78 out of engagement with the contact 80 prevents the further firing of the boiler 10, and stops the further supply of heat to the space to be heated. Movement of switch arm 77 from engagement with its contact 79 prevents energization of relay coil 76 until the boiler water temperature has fallen a predetermined amount so as to move the switch arm 57 into engagement with its associated contact screw 63. When the switch arm 71 has moved again into engagement with the contact 73, and when the switch arm 57 has moved into engagement with its contact 63, the above cycle of operation will be repeated. By having the electric heater 75 raise the temperature of the bimetallic element 70 so as to prematurely break contact between the flexible switch arm 71 and its associated contact 73 in the manner pointed out above, an anticipating function is performed whereby the firing of the boiler is stopped prematurely so that the residual or latent heat stored in the boiler and the radiators may bring the temperature of the space to be heated up to the normal value. Therefore the heater 75, cooperating with the bimetallic element 70 during this portion of the cycle of the operation, acts as a timing mechanism and prevents "over-shooting" of the space temperature. If, however, the latent heat stored in the heating system is not sufficient to bring the temperature up to normal, the above cycle of operation is repeated until the temperature within the space to be heated rises to 70° to maintain the switch arm 71 and the contact 73 disengaged.

If the boiler water temperature becomes abnormally high, the high limit mercury switch 68 is moved to an "off" or "circuit opening" position which prevents energization of the relay coil 76 by engagement of switch arm 71 with its associated contact 73.

If the room temperature should fall below 70°, or should be below 70° as the result of a night shut-down, the switch arm 72 engages with its contact 74. Movement of the switch arm 72 into engagement with the contact 74 completes a circuit from the secondary 88 through wires 89 and 90, bimetallic element 70, switch arm 72, contact 74, wire 91, relay coil 76, and wire 92 back to the secondary 88. Completion of this circuit energizes the relay coil 76 and causes firing of the boiler 10 to supply heat to the space to be heated to restore the temperature thereof to normal. This circuit maintains the boiler in a fired condition, regardless of the position of the parts of the controller 18, so that the temperature of the room or space to be heated is quickly brought up to 70°, at which time contact between the switch arm 72 and the contact 74 is broken. The system will then cycle back and forth under the control of the switch arm 71 and its contact 73 and under the control of the controller 18 in the manner pointed out above.

Referring now to Fig. 4, I have shown a modified form of my invention which utilizes the same controller 18 responsive to changes in boiler water temperature, the same room thermostat 17, responsive to temperature values existing in the space to be heated, the same solenoid valve 12 under the control of the same relay coil 76 which receives its power from the same step-down transformer 87. The main distinction between the modification shown in this figure and that shown in Fig. 1, is the location of the high limit mercury switch 68 in the electrical circuit, and the provision of a thermal electric switching mechanism in lieu of the heater 75. The thermal electric switching mechanism is designated generally at 110, and comprises a bimetallic element 111, which is heated by a heater 112 juxtapositioned with respect thereto. The bimetallic element 111 carries a contact 113 which is adapted to engage a stationary contact 114. Upon energization of the heater 112, the bimetallic element 111 is flexed to break contact between the contacts 113 and 114. After the heater 112 is deenergized, the bimetallic element 111 moves back to its normal position to make contact between the contacts 113 and 114.

One end of the secondary 88 is connected by a wire 120 to one of the electrodes in the mercury switch 68, the other electrode being connected by wires 121 and 122 to the contact 73. The other contact 74 of the room thermostat 17 is connected by a wire 123 to one end of the relay coil 76. The other end of the relay coil 76 is connected by a wire 124 to the other end of the secondary 88. The bimetallic element 70 of the room thermostat 71 is connected by a wire 125 to the stationary contact 114 of the thermal electric switch 110. The bimetallic element 111 is connected by a wire 126 to the switch arms 57 and 59 of the controller 18. The switch arm 58 of the controller 18 is connected by wires 127 and 128 to the contact 79. The switch arm 77, which cooperates with the contact 79, is connected by a wire 129 to the junction of wires 123 and the relay coil 76. Switch arm 77 is also connected by a wire 130 to the contact screw 63 of the controller 18. The contact screw 64 is connected by a wire 131 to the junction of wires 121 and 122. One end of the heater 112 is connected by a wire 132 to the junction of wires 127 and 128 and the other end of the heater 112 is connected by a wire 133 to the contact screw 65 of the controller 18. The thermostat 17 of this modification, as in the previous modification, is so adjusted that contact will be established between the switch arm 71 and the contact 73 at 72°, and between the switch arm 72 and the contact 74 at 70°.

With the parts in the position shown, the room or space temperature is above 72° and the boiler water temperature has dropped the predetermined amount since switch arms 57 and 58 are engaged with their respective contact screws 63 and 64 and the switch arm 59 is disengaged from its contact screw 65. The electromagnetic valve 12 is closed and the boiler is not being fired so the temperature of the room or space to be heated decreases. When the temperature decreases to 72°, the switch arm 71 is moved into engagement with the contact 73 to complete a circuit from the secondary 88 through wire 120, high limit switch 68, wires 121 and 122, contact 73, switch arm 71, bimetallic element 70, wire 125, contacts 114 and 113, bimetallic element 111, wire 126, switch arm 57, contact 63, wires 130 and 129, relay coil 76 and wire 124 back to the secondary 88. This causes energization of the relay coil 76 and consequent firing of the boiler to supply heat to the room or space to be heated by energizing valve 12 by the circuit described in connection with Fig. 1. Energization of the relay coil 76 also moves the switch arm 77 into engagement with the contact 79 to complete a circuit from the secondary 88 through wire 120, mercury switch 68, wire 121, wire 131, contact screw 64, switch arm 58, wires 127 and 128, contact 79, switch arm 77, wire 129, relay coil 76, and wire 124 back to the secondary 88. Completion of this circuit maintains the relay coil 76 energized, regardless of the position of the switch arm 71 with respect to its contact 73.

By reason of the firing of the boiler, the boiler water temperature increases and causes contact between the switch arm 59 and the contact 65 to be made and cause the switch arm 57 to separate from the contact 63. At this point the switch arm 58 is still maintained in engagement with its contact 64. Movement of the switch arm 59 into engagement with the contact 65 completes a circuit from the secondary 88 through wire 120, mercury switch 68, wires 121 and 122, contact 73, switch arm 71, bimetallic element 70, wire 125, contacts 114 and 113, bimetallic element 111, wire 126, switch arm 59, contact 65, wire 133, heater 112, wires 132 and 128, contact 79, switch arm 77, wire 129, relay coil 76, and wire 124 back to the secondary 88. Completion of this circuit, however, does not cause immediate energization of the heater 112 since the heater 112 is shunted by the above referred to maintaining circuit completed through the switch arm 58 and the contact 64 of the controller 18.

Upon a further rise in boiler water temperature, due to the continued firing of the boiler, the switch arm 58 moves out of engagement with the contact 64 to break the above referred to maintaining or shunting circuit to cause energization of the heater 112 and consequent heating of bimetallic element 111. After a predetermined time, which is determined by the resistance in the heater 112, or the adjustment of contacts 113 and 114, the bimetallic element 111 moves the contact 113 out of engagement with the contact 114, to break the last described circuit to deenergize the relay coil 76. The solenoid valve 12 thereupon closes and prevents the further supply of heat to the room or space to be heated except for that heat already present in the system. From this it is seen that the thermal electric switching mechanism acts as a timing mechanism and may stop firing of the boiler before the room temperature is brought back up to 72°, which permits the residual or latent heat in the heating system to bring the room temperature back up to normal. This largely prevents "overshooting" of the room temperature. If, however, this residual or latent heat remaining in the heating system is not sufficient to bring the temperature of the space to be heated up to normal, the above cycle of operation is repeated after the boiler water temperature has decreased a predetermined amount as determined by the setting of the controller 18.

As in the previous modification provision is made for continually firing the boiler when the room temperature is below 70°, regardless of the positions of the parts of the controller 18. When the room temperature falls below 70° a circuit is completed from the secondary 88 through wire 120, mercury switch 68, wires 121 and 122, contact 73, switch arms 71 and 72, contact 74, wire 123, relay coil 76 and wire 124 back to the secondary 88. Completion of this circuit causes energization of the relay coil 76 and consequent firing of the boiler until the room temperature is restored to 70°, at which time contact between the switch arm 72 and the contact 74 is broken. The system then cycles in the manner above described until the room temperature is brought up to 72°.

In contradistinction to the previous modification, the high limit mercury switch 68 is positioned in both circuits controlled by the room thermostat 17 so that if the boiler water temperature becomes abnormally high, firing of the boiler is prevented regardless of the room temperature.

From the above it is seen that I have provided a control system for a condition or force changing device for placing the condition or force changing device in operation when a first condition or force reaches a given value, then maintaining operation of the condition or force changing device independently of the first condition or force until there is a predetermined change in a second condition or force, or in the effectiveness of the condition or force changing device, thereafter controlling the condition or force changing device in accordance with the value of the first condition or force, varying or interrupting this subsequent control in response to the first condition or force, controlling the condition or force changing device solely by the first condition or force when the first condition or force assumes a given value, and preventing control of the condition or force changing device when the second condition or force assumes a given value.

While specific embodiments of the invention have been herein described and specific values of a condition or force have been set forth, it will be clear that many changes in the details of the apparatus and system and the values of the conditions or forces can be made without departing from the spirit of the invention, and I therefore intend to be limited only by the scope of the appended claims and the prior art.

I claim as my invention:

1. In a temperature changing system, in combination, a temperature changer, means for controlling the operation of said temperature changer, a main controlling thermostat, a secondary thermostat responsive to a condition directly produced by said temperature changer, connections between said thermostats and temperature controlling means for placing the latter into operation, connections between said secondary thermostat and temperature controlling means for maintaining the latter in operation independently of said main controlling thermostat, connections between said thermostats and temperature changer controlling means for returning the control of the latter to said main controlling thermostat, and means for automatically varying the control of said temperature changer controlling means by said main controlling thermostat when said main thermostat is in control of said temperature changer.

2. In a temperature changing system, in combination, a temperature changer, means for controlling the operation of said temperature changer, a main controlling thermostat, a secondary thermostat responsive to a condition directly produced by said temperature changer, connections between said thermostats and temperature controlling means for placing the latter into operation, connections between said secondary thermostat and temperature controlling means for maintaining the latter in operation independently of said main controlling thermostat, connections between said thermostats and temperature changer controlling means for returning the control of the latter to said main controlling thermostat, and means in said last mentioned connections for varying the control of said temperature changer controlling means by said main controlling thermostat.

3. In a temperature changing system, in combination, a temperature changer, means for controlling the operation of said temperature changer, a main controlling thermostat, a secondary thermostat responsive to a condition directly produced by said temperature changer, connections between said thermostats and temperature controlling means for placing the latter into operation, connections between said secondary thermostat and temperature controlling means for maintaining the latter in operation independently of said main controlling thermostat, connections between said thermostats and temperature changer controlling means for returning the control of the latter to said main controlling thermostat, and means for interrupting the control of said temperature changer controlling means by said main controlling thermostat when said main thermostat is in control of the temperature changer.

4. In a temperature changing system, in combination, a temperature changer, means for controlling the operation of said temperature changer, a main controlling thermostat, a secondary thermostat responsive to a condition directly produced by said temperature changer, connections between said thermostats and temperature controlling means for placing the latter into operation, connections between said secondary thermostat and temperature controlling means for maintaining the latter in operation independently of said main controlling thermostat, connections between said thermostats and temperature changer controlling means for returning the control of the latter to said main controlling thermostat, and connections between said main controlling thermostat and said temperature changer controlling means for controlling the latter independently of said secondary thermostat.

5. In a temperature changing system, the combination of, temperature changing means for a space, a thermostat responsive to variations in space temperature, a controller responsive to the condition of said temperature changing means, means controlled by the thermostat and the controller for placing the temperature changing means in operation upon a call for temperature change by the thermostat, for thereafter maintaining the temperature changing means in operation independently of the thermostat until the condition of the temperature changing means has changed a predetermined amount and for thereafter returning the control of the temperature changing means to the thermostat to maintain the temperature changing means in operation until the thermostat is satisfied, and means operative upon returning of the control of the temperature changing means to the thermostat for prematurely stopping operation of the temperature changing means.

6. In a heating system, the combination of, heating means for heating a space, a thermostat responsive to variations in space temperature, a controller responsive to the condition of the heating means, means controlled by the thermostat and the controller for placing the heating means in operation upon a call for heat by the thermostat, for thereafter maintaining the heating means in operation independently of the thermostat until the condition of the heating means has changed a predetermined amount and for thereafter returning the control of the heating means to the thermostat to maintain the heating means in operation until the thermostat is satisfied, an auxiliary heater for the thermostat, and means operative upon returning of the control of the heating means to the thermostat for energizing the auxiliary heater for prematurely stopping operation of the heating means.

7. In a heating system, the combination of, heating means for heating a space, electromagnetic means for operating the heating means when energized and including a maintaining switch closed upon energization of the electromagnetic means, a thermostatic switch operated in response to variations in space temperature and closed upon a decrease in space temperature, switching means operated in response to variations in the condition of the heating means, means for completing a starting circuit through the thermostatic switch, the switching means and the electromagnetic means upon a call for heat by the thermostatic switch, means for thereafter completing a holding circuit through the switching means, the maintaining switch and the electromagnetic means for maintaining the heating means in operation until the condition of the heating means changes a predetermined amount, means for thereafter completing a maintaining circuit through the thermostatic switch, the maintaining switch and the electromagnetic means for maintaining the heating means in operation until the thermostatic switch is satisfied, and means operative upon completing of the maintaining circuit for prematurely interrupting the maintaining circuit to stop prematurely the operation of the heating means.

8. In a heating system, the combination of, heating means for heating a space, electromagnetic means for operating the heating means when energized and including a maintaining switch closed upon energization of the electromagnetic means, a thermostatic switch operated in response to variations in space temperature and closed upon a decrease in space temperature, switching means operated in response to variations in the condition of the heating means, means for completing a starting circuit through the thermostatic switch, the switching means and the electromagnetic means upon a call for heat by the thermostatic switch, means for thereafter completing a holding circuit through the switching means, the maintaining switch and the electromagnetic means for maintaining the heating means in operation until the condition of the heating means changes a predetermined amount, means for thereafter completing a maintaining circuit through the thermostatic switch, the maintaining switch and the electromagnetic means for maintaining the heating means in operation until the thermostatic switch is satisfied, and an auxiliary heater for the thermostat located in said maintaining circuit and energized upon completion of the maintaining circuit for prematurely stopping operation of the heating means.

GEORGE H. FISHER.